US009003541B1

(12) United States Patent
Patidar (10) Patent No.: US 9,003,541 B1
(45) Date of Patent: Apr. 7, 2015

(54) METHOD AND APPARATUS FOR DESKTOP PRODUCT LICENSE PORTABILITY WITH USER IDENTITY SUBSCRIPTION USING DURABLE TOKENS

(75) Inventor: Mansukh Patidar, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 818 days.

(21) Appl. No.: 12/644,205

(22) Filed: Dec. 22, 2009

(51) Int. Cl.
*G06F 21/00* (2013.01)
*G06F 21/50* (2013.01)

(52) U.S. Cl.
CPC ..................................... *G06F 21/50* (2013.01)

(58) Field of Classification Search
USPC ...................................... 713/158, 159; 726/26
See application file for complete search history.

(56) References Cited

U.S. PATENT DOCUMENTS

| | | | |
|---|---|---|---|
| 5,790,664 A * | 8/1998 | Coley et al. .................... 709/203 |
| 6,189,146 B1 * | 2/2001 | Misra et al. .................... 717/177 |
| 6,799,277 B2 * | 9/2004 | Colvin ............................. 726/22 |
| 7,483,860 B2 * | 1/2009 | Cronce et al. ................... 705/50 |
| 7,970,375 B2 * | 6/2011 | Date et al. ...................... 455/405 |
| 8,381,305 B2 * | 2/2013 | Jacobson ......................... 726/26 |
| 8,560,454 B1 * | 10/2013 | Bhatia et al. .................... 705/59 |
| 2002/0128976 A1 * | 9/2002 | O'Connor et al. ............... 705/59 |
| 2002/0174356 A1 * | 11/2002 | Padole et al. .................. 713/200 |
| 2003/0088516 A1 * | 5/2003 | Remer et al. .................... 705/59 |
| 2004/0214560 A1 * | 10/2004 | Date et al. ...................... 455/418 |
| 2004/0267590 A1 * | 12/2004 | Clark et al. ....................... 705/9 |
| 2007/0130079 A1 * | 6/2007 | Ivanov et al. .................... 705/59 |

\* cited by examiner

*Primary Examiner* — Mohammad L Rahman (74) *Attorney, Agent, or Firm* — Kilpatrick Townsend & Stockton LLP (57) ABSTRACT

A method, apparatus and computer program product relating to software license tokens is presented. A client system requests launching of a software application and retrieves a first software license token associated with the software application. The client system determines whether the license token associated with the software application is valid, wherein when the license token is valid, the client system launches the software application. When the license token is not valid then the client system requests a replacement license token. The client system receives the replacement license token and stores the replacement license token. The client system then retrieves the stored license token and determines whether the license token is valid. When the license token is valid, then the software application is launched, when the software license token is not valid then the client system refrains from launching of the software application.

17 Claims, 5 Drawing Sheets

METHOD AND APPARATUS FOR DESKTOP PRODUCT LICENSE PORTABILITY WITH USER IDENTITY SUBSCRIPTION USING DURABLE TOKENS

BACKGROUND

A software license is a legal instrument governing the usage or redistribution of software. A typical software license grants an end-user permission to use one or more copies of software. There are several types of software licenses. One type of software license is freeware (sometimes referred to as shareware). Freeware software is created by an author and put into the public domain; there are no copyright restrictions. Freeware can be copied and distributed freely. Shareware is copyrighted software that the developer encourages you to copy and distribute. This permission is explicitly stated in the documentation. The developer usually requests a registration fee if you like the software and plan to use it. Registering the software usually ensures that program and documentation updates are sent to you.

Another type of software license is a Limited License (LL). An LL is an agreement whereby software is purchased with limits and/or restrictions on the number of copies available for installation or use. LL's are sometimes limited to a designated number of computers (up to the number of group copies purchased) or as many users operating a program at any given time as the number of concurrent copies purchased. Some LL's for educational institutions are restricted to use in connection with on-campus computing facilities that are used solely in support of classroom instruction and research activities of students, teaching faculty and staff, and research staff.

Another type of software license is an Unlimited Site License (USL). A USL is an agreement whereby software is purchased with no limit on the number of copies available for installation. USL's are sometimes limited to specific people (such as state-funded faculty and staff). The only cost that an individual or department may have to bear is the cost of burning a CD and/or purchasing documentation. Some USL's are available for checkout, usually for one to three days, others are downloadable via the Internet. Documentation for some USL's may be found on limited loan in the Library's Reserve Book Room or in PDF format on the Internet.

Yet another type of software license is referred to as desktop license/perpetual license. This type of software license permanently binds the license to customer's system. A customer can transfer the license to another system by explicitly deactivating the software from first system and then provisioning the second system. Still another type of software license is known as online service license, wherein a user always need to be connected with a backend licensing system in order to use the entitled products/services.

SUMMARY

Conventional mechanisms such as those explained above suffer from a variety of deficiencies. In traditional desktop software provisioning, a license is bound to a system. Once a product is licensed on a given system, the same license cannot be used to run that software on a different system. A customer can transfer the license to another system by explicitly deactivating the software from first system and then provisioning the second system, however, this process is time consuming and labor intensive.

There are several interrelated problems when desktop licensing is tied to user identity rather than a system identity. One such problem is that the user has to be connected every time the product is launched or each time the licensing system attempts to validate the license. This means that User Identity based licenses cannot be used in offline mode and would rule out such use in desktop licensing. Another problem that needs to be addressed with present software licenses is that the user should not be able to run the entitled product on multiple systems, simultaneously, for a longer period of time. Still another problem with current software licensing techniques is that the user should be able to convert the user identity based license into a perpetual license, meaning that once the user opts for perpetual mode, that license would be tied to that system allowing the user to continue using that software on the given system continuously (throughout license expiration), without needing the user to connect frequently/regularly. Concurrently, there may be a need to prevent the user from entitling products from that license on other systems.

Embodiments of the invention significantly overcome such deficiencies and provide mechanisms and techniques that provide for desktop product license portability with user identity subscription using durable tokens. By way of the presently described mechanisms and techniques that provide for desktop product license portability with user identity subscription using durable tokens user's software licenses are managed on a back-end system. A user's system only contains cache copies of software license tokens. Even if a user's system is crashed or corrupted or licensing state is invalidated, the user does not loose the product entitlement and can reclaim the entitlement by going online before product launch. The user does not always need an Internet connection for using the products, an Internet connection is only required when the software license token durability has expired.

In a particular embodiment of a method for providing desktop product license portability with user identity subscription using durable tokens, a client system requests launching of a software application and retrieves a first software license token associated with the software application. The client system further determines whether the first software license token associated with the software application is valid, wherein when the first software license token associated with the software application is valid, the client system launches the software application; and wherein when the software license token associated with the software application is not valid then the client system requests a replacement software license token associated with the software application. The client system receives the replacement software license token and stores the replacement software license token associated with the software application as the software license token associated with the software application. The client system then retrieves the software license token associated with the software application and determines whether the software license token associated with the software application is valid. When the software license token associated with the software application is valid, then the software application is launched on the client system, when the software license token associated with the software application is not valid then the client system refrains from launching of the software application on the client system.

In another particular embodiment of a method for providing desktop product license portability with user identity subscription using durable tokens, a licensing system receives a request for a software license token associated with a software application and determines whether a user associated with the request for a software license token associated with the software application is authorized. When the user is authorized, the licensing system determines whether the software license token associated with the software application is issued to another system, wherein when the software license token associated with the software application is issued to another system, then the licensing system generates a denial token and issues the denial token. When the software license token associated with the software application is not issued to another system, then the licensing system generates a replacement software license token associated with the software application, the replacement software license token having a new expiration time, and issues the replacement software license token associated with the software application.

Other embodiments include a computer readable medium having computer readable code thereon for providing desktop product license portability with user identity subscription using durable tokens. The computer readable medium includes instructions wherein a client system requests launching of a software application and retrieves a first software license token associated with the software application. The computer readable medium further includes instructions wherein the client system further determines whether the first software license token associated with the software application is valid, wherein when the first software license token associated with the software application is valid, the client system launches the software application; and wherein when the software license token associated with the software application is not valid then the client system requests a replacement software license token associated with the software application. The computer readable medium includes additionally includes instructions wherein the client system receives the replacement software license token and stores the replacement software license token associated with the software application as the software license token associated with the software application. The computer readable medium includes instructions wherein client system then retrieves the software license token associated with the software application and determines whether the software license token associated with the software application is valid. The computer readable medium includes instructions wherein when the software license token associated with the software application is valid, then the software application is launched on the client system, and includes instructions wherein when the software license token associated with the software application is not valid then the client system refrains from launching of the software application on the client system.

Another particular embodiment includes a computer readable medium having computer readable code thereon for providing desktop product license portability with user identity subscription using durable tokens for a licensing system. The computer readable medium includes instructions wherein a licensing system receives a request for a software license token associated with a software application and determines whether a user associated with the request for a software license token associated with the software application is authorized. The computer readable medium further includes instructions wherein when the user is authorized then the licensing system determines whether the software license token associated with the software application is issued to another system, wherein when the software license token associated with the software application is issued to another system, then the licensing system generates a denial token and issues the denial token. The computer readable medium additionally includes instructions wherein when the software license token associated with the software application is not issued to another system, then the licensing system generates a replacement software license token associated with the software application, the replacement software license token having a new expiration time, and issues the replacement software license token associated with the software application.

Still other embodiments include a computerized device (e.g. a client system, a backend licensing system or a combination thereof), configured to process all the method operations disclosed herein as embodiments of the invention. In such embodiments, the computerized device includes a memory system, a processor, communications interface in an interconnection mechanism connecting these components. The memory system is encoded with a process that provides desktop product license portability with user identity subscription using durable tokens as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing desktop product license portability with user identity subscription using durable tokens as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems Incorporated of San Jose, Calif.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The presently described method and apparatus for desktop product license portability with user identity subscription using durable tokens relates to a method for software licensing based on user identity instead of being tied to system identity. Since software is owned by the users, and not the systems, the licensing should be tied to the user's identity rather than systems. This invention discusses a desktop license portability mechanism by applying the concept of durable tokens.

Specifically, a software license token with pre-determined durability is obtained by submitting a user identity, system identity, and the software product identity to an online licensing system. The user identity is an on online authenticated identifier. The system identity is a system signature based on attributes of the system and is unique for that particular system. The software product identity is used to identify a particular software application.

Once obtained, the software license token is stored in a token cache of a local licensing subsystem on the client system to enable the software to be launched on the client system. In addition, a user may obtain software license tokens for more than one system with reduced licensing lifetime of each system, for example the duration of validity of each software license token may be inversely proportional to the number of systems while each software license token may be renewed for a fixed number of times. Once the token expires beyond the duration of validity, a renewed software license token needs to be obtained from the online licensing backend system to sustain the software being operational. Accordingly, the user may activate multiple systems to operate the software product with total life of the license on multiple systems being independent of the number of systems. The system can be randomly assigned since each software license token is only activate one system over the duration of validity before renewal is requested, allowing the licensing backend system to ensure an accurate count of total number of systems having active software license tokens at all times. In such a manner, the presently described method and apparatus provides customer satisfaction, increased revenue recognition opportunities, and aids in preventing abuse of license counts.

Whenever a product is launched on a client system, the local licensing subsystem is queried to check for entitlement. The local licensing subsystem includes a validation module and a software license token store. The software license token store keeps a cache of software license tokens retrieved from the licensing backend system for that particular client system. The license validation module retrieves software license tokens from this store based on user and product identity. Each software license token includes an expiration time. If this time is expired, the software license token is assumed to be invalid. Whenever an invalid software license token is encountered, the local licensing subsystem requests connection to an online licensing backend licensing system for renewing the software license token.

Figure 1:
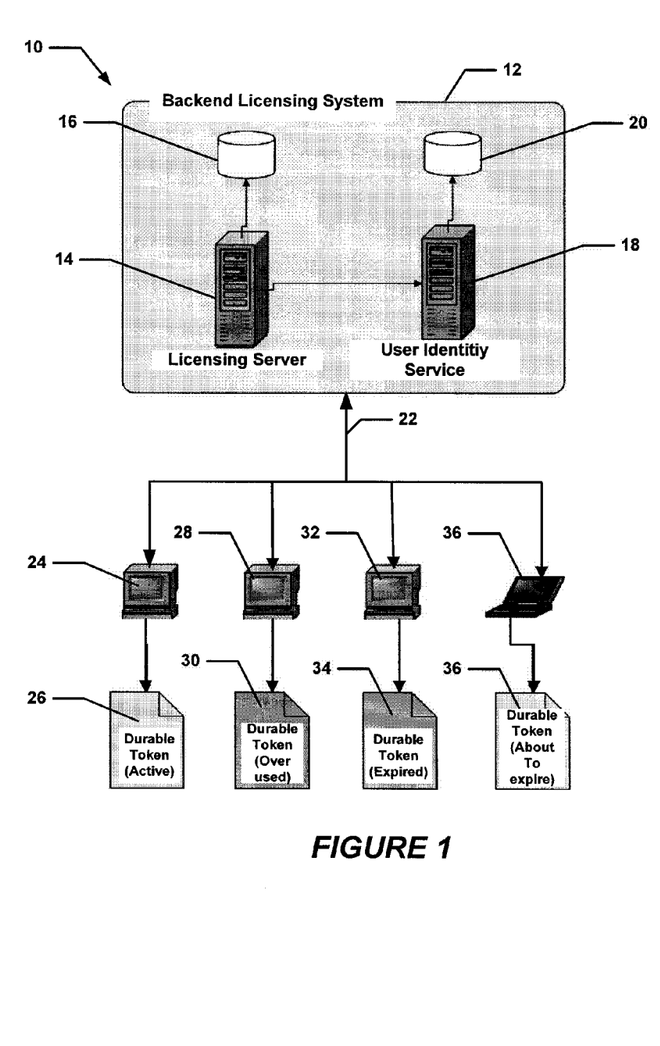
FIG. 1 depicts a block diagram of an environment for providing desktop product license portability with user identity subscription using durable tokens.

Referring now to FIG. 1, a particular embodiment of a licensing environment 10 in accordance with embodiments of the presently described method and apparatus for desktop product license portability with user identity subscription using durable tokens is shown. One or more client systems 24, 28, 32 and 36 are shown in communication with a backend licensing system 12. The backend licensing system 12 includes a licensing server 14 connected to an activation database 16. The licensing server 14 is also in communication with a user identity service system 18 which is connected to a customer database 20.

In a first example, a user utilizing an office computer 24 (client system) requests to launch a software application. A software license token 26 for that software application is retrieved from a local cache of software license tokens. A software license token, in one particular embodiment, includes the following information: a system identifier, a user identifier, licensing metadata, acquisition time information and expiration time information.

The system identifier aids in preventing copying of tokens. When a software license token is issued, the software license token itself is some type of a document (e.g. an encrypted eXtensible Markup Language (XML) document or the like) kept at a common location or folder. A user may be tempted to copy these folders in order to create multiple instances of a given software license token in order to use the same software license token to launch a product on multiple machines (especially for offline machines). A system identifier is a unique key assigned to a system (computed dynamically from system parameters) and is also known as a system signature. By embedding the system identifier as a parameter, the licensing client will fail while validating a token copied from another system since the wrong value of the system signature will be used.

The user identity information prevents unauthorized usage. As described above, the received software license tokens (documents) are kept at a common location. Assuming that user A has purchased a license for a product P1 and user B has purchased a license for product P2. First user A logs on system S and is issued a token T1 for product P1 on system S. After some time, while T1 is still active, user B logs on system S and requests a token for P2. Now system S has two tokens (T1 for product P1 and T2 for product P2). If the user identity is not part of token validation, then any of the users A, B can use any of the product P1 and P2 on that system. However, since the user identity is part of the token validation, licensing client will fail in T2 token validation for user A and T1 validation for user B and they would be prevented from using the products which they are not entitled for, while allowing the use of the products they are entitled for.

A determination is made whether that particular software license token 26 for the application has expired. In this example the software license token 26 has not expired, and the application will launch.

In another example a user utilizing a home computer 28 (client system) requests to launch a software application. A software license token 30 for that software application is retrieved from a local token store of software license tokens. A determination is made whether that particular software license token 30 for the application has expired. In this example the software license token 30 is over used. Assuming that a user logs on system A; a software license token for product P is issued for that system and the system goes offline. The user switches to system B and is issued a token for product P. Now the same license has two software license token instances active. If system A comes online and connects to backend (and assuming system B is also online), the licensing backend would see this as an overuse case. One of the possible uses would be when the licensing client connects with backend for some other product/user, the system may receive an invalid token, which will be replaced in local store, so next time the product is launched, it would required a forced renewal of the token.

In another example, a user utilizing a lab computer 32 (client system) requests to launch a software application. A software license token 34 for that software application is retrieved from a local token store of software license tokens. A determination is made whether that particular software license token 34 for the application has expired. In this example the software license token 34 has expired. The lab computer 24 then requests a connection to the backend licensing system 12. The user submits the user identity, the system identity and the product identity. The user identity is verified, then a determination is made regarding whether the software license token is already issued to another system. If the software license token has been issued to another system, then a denial token is generated and issued to the lab computer 32. On the other hand, if the software license token has not been issued to another system, then a replacement software license token is generated, having a new expiration time. This software license token's durability will be adjusted as a function of system identity. This replacement software license token is issued to the lab computer 32. The lab computer's local store is updated with either the denial token or the replacement token. The software license token (either the replacement token or the denial token) for that software application is retrieved from the local cache of software license tokens. A determination is again made whether that particular software license token for the application has expired. If the software license token has expired (the denial token was retrieved) then the launch of the software application is terminated and an error message displayed. If the software license token has not expired, then the application is launched.

In another example a user utilizing a laptop computer 36 (client system) requests to launch a software application. A software license token 38 for that software application is retrieved from a local token store of software license tokens. A determination is made whether that particular software license token 38 for the application has expired. In this example the software license token 38 is about to expire. Whenever a software license token is about to expire, the licensing client will try to reach the backend licensing system for a possible renewal, but this will not prevent the user from working with the product. A software license token about to expire can function as a signal for preemptive renewal.

The duration of a software license token, for which a local copy of a license would be valid, is dynamically computed and depends on the following parameters (this is also referred to as the durability of the software license token). The duration may be inversely proportional to the number of systems where that license is used recently. The duration may also be inversely proportional to the frequency of switching the license between systems. The more the user switches systems for using a product, the more short term the local copy of license is, and the licensing system needs more frequently connection to the backend licensing system. To start with, a default durability value, derived from heuristic data, is assigned to all software license tokens.

The reason a denial token is generated and issued, rather than just terminating the launch of the software application, is that the client system does not contain any logic to manipulate the software license tokens. Even if a software license token is expired, the client system cannot manipulate (update/delete) that software license token. The server sends a software license token and the client simply replaces older copies in the local token store with the newly acquired tokens. There are other reasons why explicit denial tokens are generated. Whenever the backend licensing system is contacted, it could send software license tokens for other License/User combination. For example, user A has been issued a software license token T1 for license L1 on system M. After some amount of time user A switches to system M2. However, the software license token issued to user A on system M1 is still valid, until it expires. If User B signs in on system M to use another license L2, then the backend licensing system can send a valid software license token T2 and at the same time, issue another software license token T1' which invalidates T1.

Figure 2A:
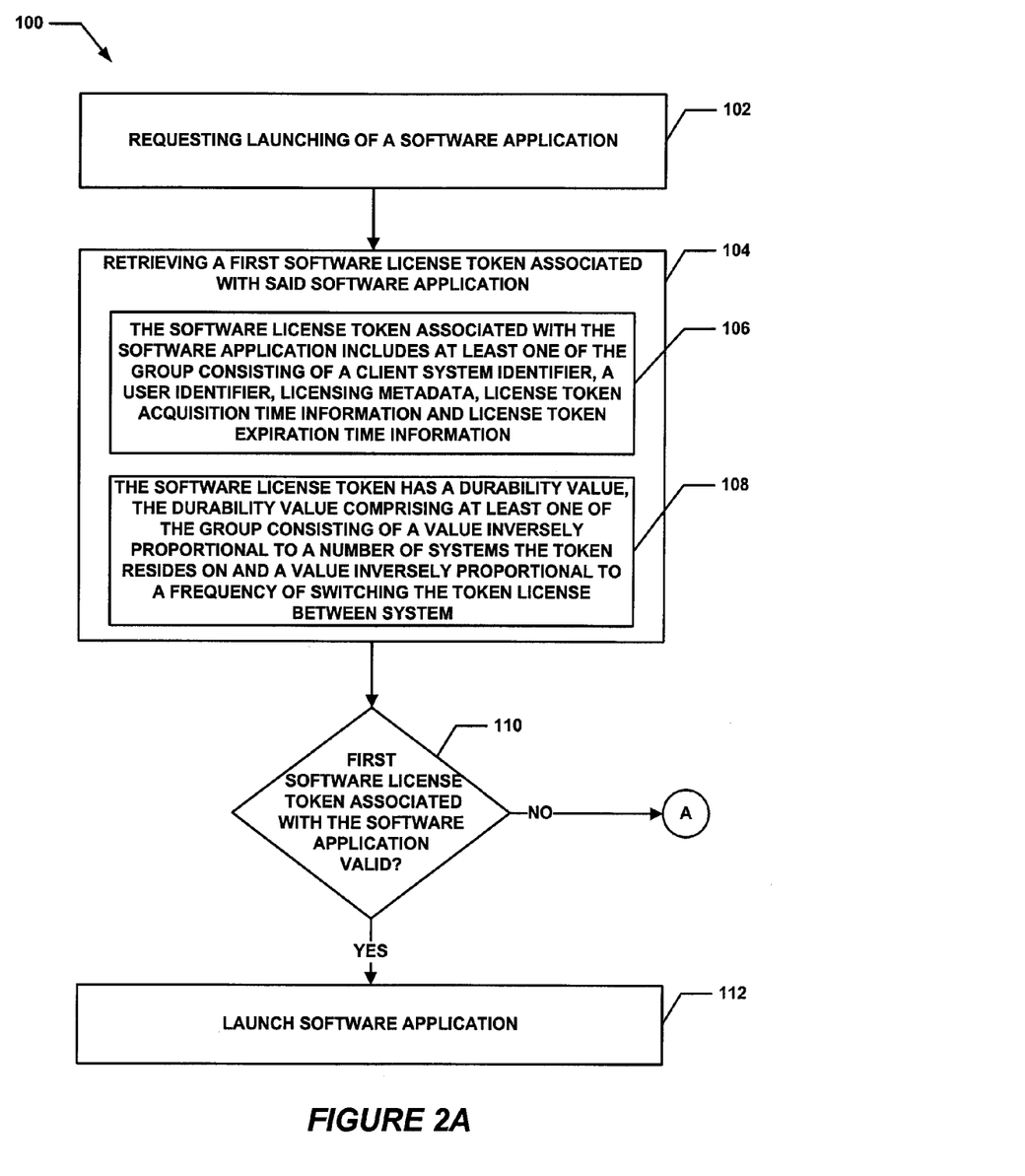
FIGS. 2A and 2B comprises a flow diagram of a particular embodiment of a method for a client system utilizing desktop product license portability with user identity subscription using durable tokens.
Figure 2B:
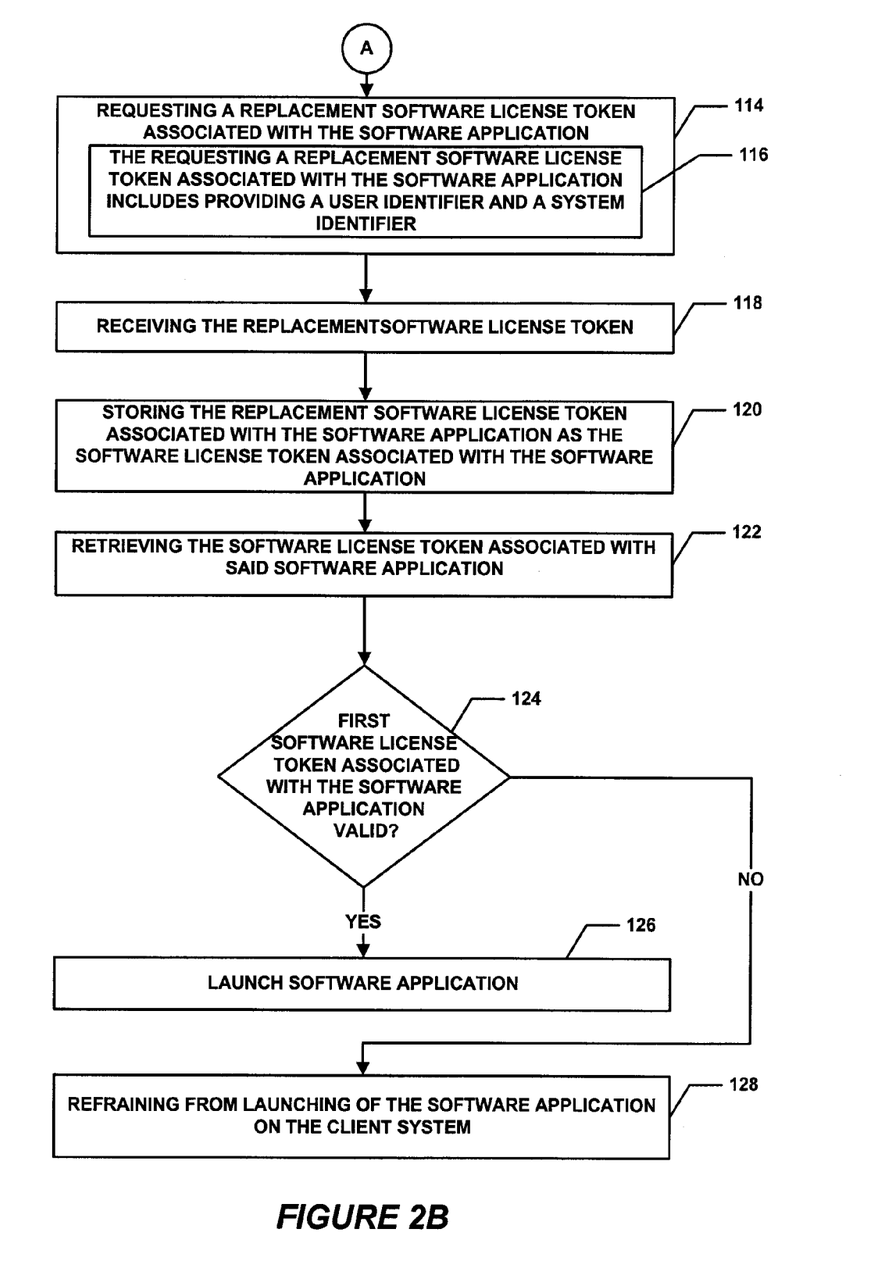
Figure 3:
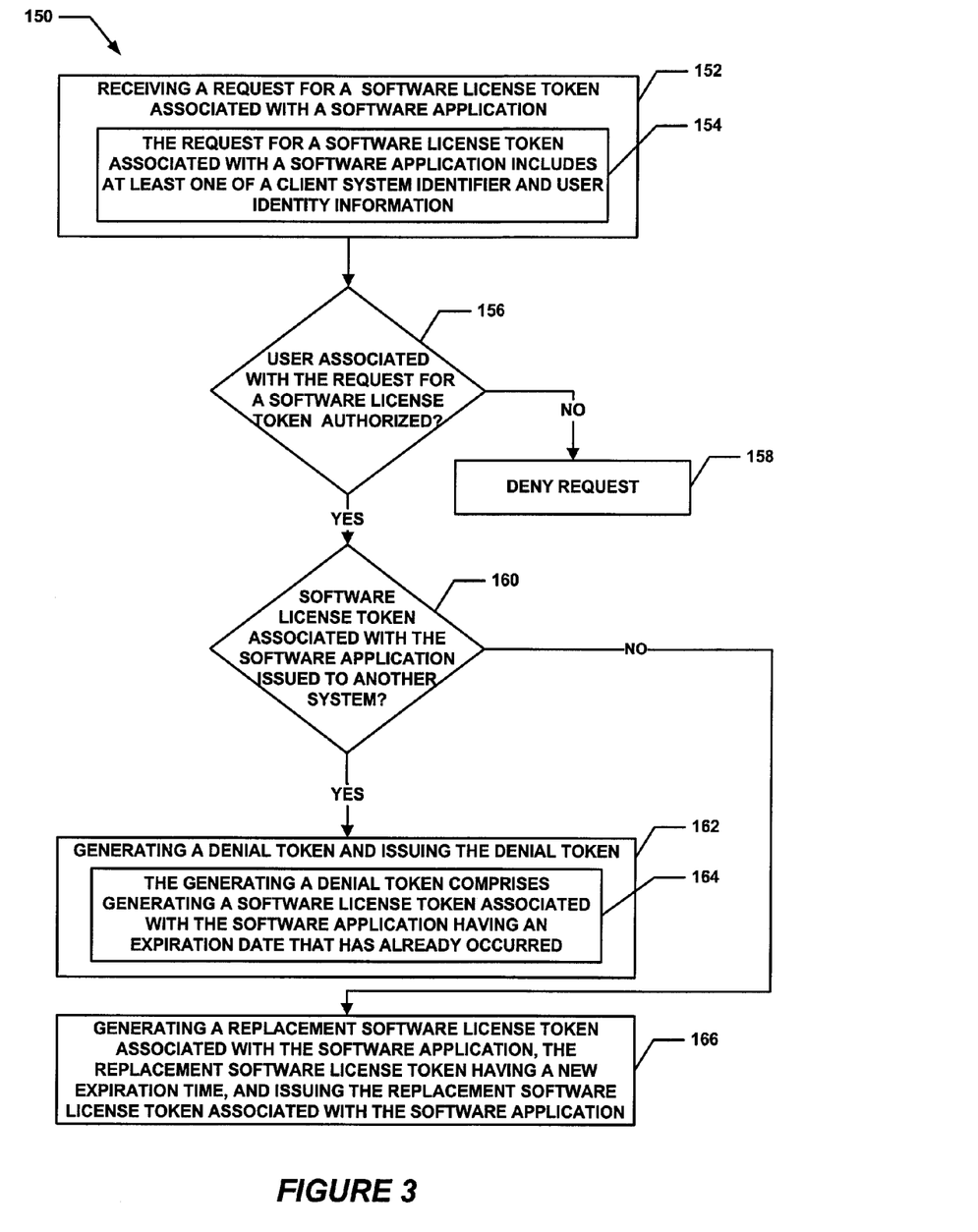
FIG. 3 depicts a flow diagram of a particular embodiment of a method for a licensing system utilizing desktop product license portability with user identity subscription using durable tokens.

Flow diagrams of particular embodiments of the presently disclosed method are depicted in FIGS. 2A, 2B and 3. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a particular embodiment of a method 100 of providing desktop product license portability with user identity subscription using durable tokens via a client computer system is shown. Method 100 begins with processing block 102, which discloses requesting launching of a software application. A user attempts to execute an application. Before the application can be run, a software license token associated with the user for the application needs to be verified.

Processing block 104 states retrieving a first software license token associated with the software application. The software license token is retrieved from a local token store of software license tokens. Processing block 106 recites the software license token associated with the software application includes at least one of the group consisting of a client system identifier, a user identifier, licensing metadata, software license token acquisition time information and software license token expiration time information. As further depicted in processing block 108, the software license token has a durability value, the durability value comprising at least one of the group consisting of a value inversely proportional to a number of systems the token resides on and a value inversely proportional to a frequency of switching the token license between systems.

Processing continues with decision block 110 which discloses determining whether the first software license token associated with the software application is valid. When the first software license token is valid, then the software application is launched, as recited in processing block 112.

When the determination made in decision block 110 is that the first software license token is not valid, then processing continues with processing block 114 which discloses requesting a replacement software license token associated with the software application. The request is made by the client system to a backend licensing system. As recited in processing block 116, the requesting a replacement software license token associated with the software application includes providing a user identifier and a system identifier.

Processing block 118 recites receiving the replacement software license token, and processing block 120 states storing the replacement software license token associated with the software application as the first software license token associated with the software application. The local token store of the client system is updated with the replacement token whether the token is a valid token or an invalid (denial) token.

Processing block 122 discloses retrieving the software license token associated with the software application. Similar to processing block 104, the software license token is retrieved from the local token store of software license tokens.

Decision block 124 states determining whether the first software license token associated with the software application is valid. When the software license token is valid, then the software application is launched, as recited in processing block 126.

When the determination made in decision block 126 is that the software license token is not valid, then processing continues with processing block 128 which discloses refraining from launching of the software application on the client system. An error message may also be generated to inform the user that the application will not be launched.

Referring now to FIG. 3, a particular embodiment of a method 150 of providing desktop product license portability with user identity subscription using durable tokens via a backend licensing system is shown. Method 150 begins with processing block 152 which discloses receiving a request for a software license token associated with a software application. As further recited in processing block 154, the request for a software license token associated with a software application includes at least one of a client system identifier and user identity information.

Decision block 156 states determining whether a user associated with the request for a software license token associated with the software application is authorized. When the determination is made that the user is not authorized the processing proceeds with processing block 158 which states denying the request.

When the determination made at decision block 156 is that the user associated with the request for a software license token is authorized, them processing continues with decision block 160. At decision block 160 a determination is made regarding whether the software license token associated with the software application is issued to another system. When the determination made at decision block 160 is that the software license token associated with the software application is issued to another system then processing continues with processing block 162.

Processing block 162 discloses generating a denial token and issuing the denial token. As shown in processing block 164, the generating a denial token comprises generating a software license token associated with the software application having an expiration date that has already occurred.

Referring back to decision block 160, when the determination is made that the software license token associated with the software application is issued to another system then processing continues with processing block 166. Processing block 166 states generating a replacement license token associated with the software application, the replacement software license token having a new expiration time, and issuing the replacement software license token associated with the software application.

Figure 4:
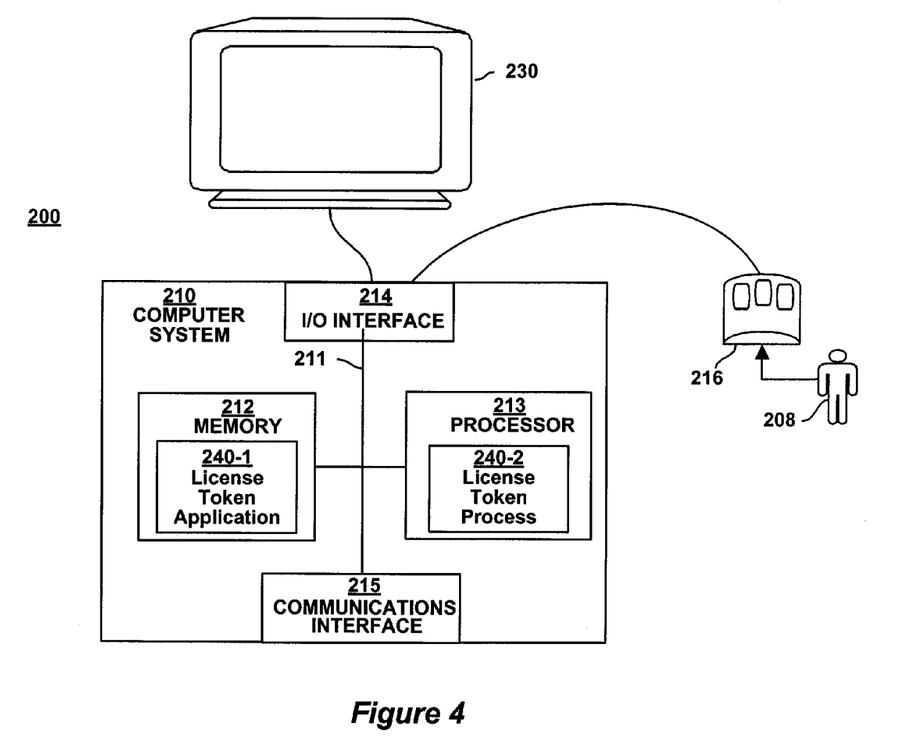
FIG. 4 illustrates an example computer system architecture for a computer system functioning as either a client system or as a licensing system that provides desktop product license portability with user identity subscription using durable tokens in accordance with embodiments of the invention.

FIG. 4 is a block diagram illustrating example architecture of a computer system 210 that executes, runs, interprets, operates or otherwise performs a software license token application 240-1 and software license token process 240-2 suitable for use in explaining example configurations disclosed herein. The computer system 210 may be any type of computerized device such as a personal computer, workstation, portable computing device, console, laptop, network terminal or the like. An input device 216 (e.g., one or more customer/developer controlled devices such as a keyboard, mouse, etc.) couples to processor 213 through I/O interface 214, and enables a customer 208 to provide input commands, and generally control the graphical customer interface 260 that the software license token application 240-1 and process 240-2 provides on the display 230. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a software license token application 240-1 as explained herein. The software license token application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a software license token application 240-1. Execution of a software license token application 240-1 in this manner produces processing functionality in the software license token process 240-2. In other words, the software license token process 240-2 represents one or more portions or runtime instances of a software license token application 240-1 (or the entire a software license token application 240-1) performing or executing within or upon the processor 213 in the computerized device 210 at runtime.

It is noted that example configurations disclosed herein include the software license token application 240-1 itself (i.e., in the form of un-executed or non-performing logic instructions and/or data). The software license token application 240-1 may be stored on a computer readable medium (such as a floppy disk), hard disk, electronic, magnetic, optical, or other computer readable medium. A software license token application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a software license token application 240-1 in the processor 213 as the software license token process 240-2. Those skilled in the art will understand that the computer system 210 may include other processes and/or software and hardware components, such as an operating system not shown in this example.

A display 230 need not be coupled directly to computer system 210. For example, the software license token application 240-1 can be executed on a remotely accessible computerized device via the network interface 215. In this instance, the graphical customer interface 260 may be displayed locally to a customer 208 of the remote computer, and execution of the processing herein may be client-server based.

During operation, processor 213 of computer system 200 accesses memory system 212 via the interconnect 211 in order to launch, run, execute, interpret or otherwise perform the logic instructions of the software license token application 240-1. Execution of software license token application 240-1 produces processing functionality in software license token process 240-2. In other words, the software license token process 240-2 represents one or more portions of the software license token application 240-1 (or the entire application) performing within or upon the processor 213 in the computer system 200.

It should be noted that, in addition to the software license token process 240-2, embodiments herein include the software license token application 240-1 itself (i.e., the un-executed or non-performing logic instructions and/or data). The software license token application 240-1 can be stored on a computer readable medium such as a floppy disk, hard disk, or optical medium. The software license token application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of software license token application 240-1 in processor 213 as the software license token process 240-2. Those skilled in the art will understand that the computer system 200 can include other processes and/or software and hardware components, such as an operating system that controls allocation and use of hardware resources associated with the computer system 200.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
   allowing a software application to launch at a client device based on a first software license token stored at the client device;
   determining, by the client device, that the first software license token has expired;
   based on determining that the first software license token has expired, requesting a replacement software license token from a remote server and replacing the first software license token at the client device with the replacement software license token received from the remote server, wherein replacing the first software license token at the client device comprises receiving a denial token as the replacement software license token;
   receiving, by the client device, a request to launch the software application at the client device; and
   controlling, by the client device, launch of the software application at the client device based on the replacement software license token that replaced the first software license token, wherein launch of the software application at the client device is prohibited based on the replacement software license token.

2. The method of claim 1 wherein the software application is launched based on the first software license token stored at the client device without communicating with the remote server.

3. The method of claim 1 wherein the denial token comprises an expiration date that has already occurred when the replacement software license token is received at the client device.

4. The method of claim 1 wherein replacing the first software license token at the client device comprises receiving a valid software license token as the replacement software license token, wherein, after replacing the first software license token with the replacement software license token, launch of the software application at the client device is allowed until the replacement software license token expires.

5. The method of claim 1 wherein replacing the first software license token at the client device comprises receiving a valid software license token as the replacement software license token, wherein, after replacing the first software license token with the replacement software license token, launch of the software application at the client device is allowed until the replacement software license token is replaced with an invalid software license token.

6. The method of claim 1 wherein replacing the first software license token at the client device comprises requesting the replacement software license token by providing a user identifier and a system identifier to the server device, wherein the replacement software license is received based on the server device determining authorization based on the user identifier and monitoring token use on other devices.

7. The method of claim 1 wherein a denial token is received as the replacement software license token based on the server device monitoring token use on other devices.

8. The method of claim 1 wherein the client device is prevented from manipulating the first software license token.

9. The method of claim 1 wherein the first software license token and replacement software license token are associated with a same software license.

10. The method of claim 9 wherein the replacement software license token has a durability value comprising a value inversely proportional to a number of systems currently using tokens associated with the software license.

11. The method of claim 9 wherein the replacement software license token has a durability value comprising a value inversely proportional to a frequency of switching of the software license between systems.

12. The method of claim 1 wherein:
    the first software license token comprises a client system identifier and software license token expiration time information; and
    the replacement software license token comprises different software license token expiration time information.

13. A method comprising:
    receiving, at a server device, a request for a replacement software license token associated with a software application, the request received from a client device having a first software license token that is to be replaced; and
    based at least in part on token use on another device, issuing, by the server device, a denial token as the replacement software license token, the replacement software license token issued from the server device to the client device and replacing the first software license token at the client device, wherein launch of the software application at the client device is prohibited based on the replacement software license token.

14. The method of claim 13 wherein said request for a replacement software license token associated with a software application includes at least one of a client system identifier and user identity information.

15. The method of claim 13 further comprising authorizing the request by verifying at least one of the group consisting of user credentials, a license key and a system identifier.

16. The method of claim 13 wherein the denial token comprises an expiration date that has already occurred.

17. A non-transitory computer readable storage medium having computer readable code thereon, the medium including instructions in which a computer system performs operations comprising:
    allowing a software application to launch at a client device based on a first software license token stored at the client device;
    determining, by the client device, that the first software license token has expired;
    based on determining that the first software license token has expired, requesting a replacement software license token from a remote server and replacing the first software license token at the client device with the replacement software license token received from the remote server, wherein replacing the first software license token at the client device comprises receiving a denial token as the replacement software license token;
    receiving, by the client device, a request to launch the software application at the client device; and
    controlling, by the client device, launch of the software application at the client device based on the replacement software license token that replaced the first software license token, wherein launch of the software application at the client device is prohibited based on the replacement software license token.

* * * * *